United States Patent [19]
Lee et al.

[11] Patent Number: 5,895,804
[45] Date of Patent: Apr. 20, 1999

[54] THERMOSETTING POLYSACCHARIDES

[75] Inventors: Sharon P. Lee, Edison; Steven P. Pauls, Sr., Old Bridge; Daniel B. Solarek, Belle Mead, all of N.J.

[73] Assignee: National Starch and Chemical Investment Holding Corporation, Wilmington, Del.

[21] Appl. No.: 08/958,468

[22] Filed: Oct. 27, 1997

[51] Int. Cl.$^6$ .................. C08G 63/48; C08G 63/91
[52] U.S. Cl. .................. 525/54.3; 525/54.31; 528/272; 528/274
[58] Field of Search .................. 525/54.3, 54.31; 528/272, 274

[56] References Cited

U.S. PATENT DOCUMENTS

| | | | |
|---|---|---|---|
| 4,734,478 | 3/1988 | Tsabakimoto et al. | 527/300 |
| 5,026,746 | 6/1991 | Floyd et al. | 524/50 |
| 5,412,026 | 5/1995 | Holy et al. | 525/54.31 |

FOREIGN PATENT DOCUMENTS

| | | |
|---|---|---|
| 0 583 086 A1 | 2/1994 | European Pat. Off. . |
| 57-049431 | 3/1982 | Japan . |

OTHER PUBLICATIONS

P. Tomasik et al., "Complexes of Starch with Dioic Acid", Starch/Starke 47 (1995) Nr. 3, pp. 91–95.

*Primary Examiner*—Nathan M. Nutter
*Attorney, Agent, or Firm*—Eugene Zagarella, Jr.

[57] ABSTRACT

Polysaccharide based thermosetting systems and compositions which utilize such thermosets are disclosed. The composition comprises a polysaccharide having a weight average molecule weight of at least 10,000 and a polycarboxylated polymer having at least two carboxylic acid functional groups and a weight average molecular weight of at least 1,000.

19 Claims, No Drawings

THERMOSETTING POLYSACCHARIDES

FIELD OF THE INVENTION

The present invention relates to thermosetting systems based on polysaccharides and the use thereof to replace formaldehyde-based crosslinked systems.

BACKGROUND OF THE INVENTION

Synthetic polymers are used in a wide variety of applications. In many applications, these synthetic polymers are crosslinked in order to achieve the required performance properties. For over sixty (60) years, a large class of commercially important thermoset polymers has utilized formaldehyde-based crosslinking agents. Such crosslinking agents based on formaldehyde traditionally have provided an efficient and cost-effective means of curing a wide variety of materials. Examples of formaldehyde-based crosslinking agents include melamine-formaldehyde, urea-formaldehyde, phenol-formaldehyde and acrylamide-formaldehyde adducts. With growing toxicity and environmental concerns, there has been an ongoing search to replace formaldehyde-based crosslinking systems. However, these alternative systems have suffered from significant deficiencies including low or slow cure, requiring end users to change their commercial high speed application equipment, and emission of toxic components or volatile organic compounds other than formaldehyde.

A particularly attractive crosslinking reaction involves the esterification of a carboxylic acid functional polymer with a hydroxyl functional molecule. This is an attractive reaction since water is the only product of the crosslinking reaction. In EP 583 086 A1, for example, small molecule polyol or alkanolamine crosslinkers are cited as crosslinkers for carboxyl-functional polymers. However, this reaction is difficult to conduct effectively since it is slow under conventional time and temperature conditions of cure.

Outside of the investigations surrounding non-formaldehyde crosslinking agents, graft copolymers of starch and acrylic acid have been described in the literature. Graft copolymers of starch and acrylic acid have been used as water absorbing agents. Also, starch-stabilized binder compositions containing starch-polymer grafts derived from low molecular weight starch hydrolyzates have been described.

To address the need for a formaldehyde-free crosslinking system, we have found unexpectedly that selected polysaccharides in combination with selected polycarboxylated polymers provide a safe and facile crosslinking system, as described herein below.

SUMMARY OF THE INVENTION

The present invention relates to polysaccharide based crosslinking systems which are essentially free of formaldehyde and to compositions which utilize such systems. The compositions comprise a polycarboxylated polymer having at least two carboxylic acid functional groups and a weight average molecular weight of at least 1,000 and a polysaccharide molecule having a weight average molecular weight of at least 10,000 and present in amounts effective to provide crosslinked compositions.

DETAILED DESCRIPTION OF THE INVENTION

The compositions according to the present invention comprise a polycarboxylated polymer, including polymers or oligomers, having a weight average molecular weight of at least 1,000 and preferably 10,000 or more. The actual molecular weight of the polymer is not a limiting factor with respect to the use of the crosslinking systems of the present invention except that it must be at least 1,000.

The polycarboxylated polymer must contain at least two carboxylic acid groups. Exemplary polycarboxylated polymers which may be used in the present invention include without limitation poly(acrylic acid), carboxylic-acid-functionalized polyesters and carboxylic-acid-functionalized polyurethanes. Also included are polymers containing carboxyl groups and prepared from monomers such as ethylene (E), vinyl acetate (VA), (meth)acrylic acid (M)AA, the $C_1$–$C_8$, alkyl esters of (meth)acrylic acid, maleic anhydride (MAnh), maleic acid, itaconic acid (IA), crotonic acid (CA), β-carboxy ethyl acrylate (BCEA), butadiene, and styrene (STY). (Meth)acrylic is used herein to denote both acrylic and methacrylic acids and esters thereof. Exemplary copolymers include ethylene/vinyl acetate/acrylic acid copolymers, vinyl acetate/acrylic acid copolymers, acrylic acid/maleic anhydride copolymers, vinyl acetate/acrylic acid/maleic anhydride copolymers, ethylene/acrylic acid copolymers, ethylene/methacrylic acid copolymers, ethylene/vinyl acetate/acrylic acid/maleic anhydride copolymers, vinyl acetate/maleic anhydride copolymers, ethylene/vinyl acetate/maleic anhydride copolymers, methyl methacrylate/butyl acrylate/acrylic acid copolymers, methyl methacrylate/ethyl acrylate/acrylic acid copolymers, methyl methacrylate/butyl acrylate/itaconic acid copolymers, butyl acrylate/acrylic acid copolymers, butyl acrylate/BCEA copolymers, ethyl acrylate/acrylic acid copolymers, 2-ethylhexyl acrylate/acrylic acid copolymers, methyl methacrylate/ethyl (meth)acrylate/itaconic acid copolymers, styrene/(meth)acrylic acid copolymers, styrene/maleic anhydride copolymers, styrene/(meth)acrylic acid/maleic anhydride copolymers, styrene/itaconic acid copolymers and styrene/butadiene copolymers. Additionally, polymers comprising anhydride groups may be generated in situ during preparation of poly(acrylic acid). These examples are not limiting and the polysaccharides according to the 20 present invention may be used in combination with virtually any polycarboxylated polymer which comprises at least two carboxylic acid functional groups.

The polysaccharides of the present invention are derived from natural products, including plant, animal and microbial sources. Examples of polysaccharides include starch, cellulose, gums such as guar and xanthan, alginates, pectin and gellan. Polysaccharide starches include maize or corn, waxy maize, high amylose maize, potato, tapioca and wheat starch. Other starches include varieties of rice, waxy rice, pea, sago, oat, barley, rye, amaranth, sweet potato, and hybrid starches available from conventional plant breeding, e.g., hybrid high amylose starches having amylose content of 40% or more, such as high amylose corn starch. Also useful are genetically engineered starches such as high amylose potato and potato amylopectin starches.

The polysaccharides may be modified or derivatized, such as by etherification, esterification, acid hydrolysis, dextrinization, oxidation or enzyme treatment (e.g., with α-amylase, β-amylase, pullulanase, isoamylase, or glucoamylase).

The polysaccharide of the present invention has a weight average molecular weight of at least 10,000 and preferably is 100,000 or more.

In certain embodiments of the invention, the polycarboxylated polymer may be generated in situ from starting molecules which do not comprise at least two carboxyl functional groups. When the starting molecules and the polysaccharides are combined under certain conditions effective to induce crosslinking, functional groups will be generated such that the molecules comprise at least two carboxyl groups. The functional groups may be generated in situ by the addition of heat to the system or by chemical reaction with the starting molecules. For example, acid catalyzed hydrolysis of alkyl esters such as methyl or t-butyl, are very facile in generating carboxylic acid. Other mechanisms of generating functional groups in situ will be readily apparent to those skilled in the art once having the benefit of the teachings contained herein.

The polycarboxylated polymer and the polysaccharide of the crosslinking system will be present in relative amounts such that the ratio of the sum total number of equivalents of the carboxyl functional groups contained in the polycarboxylated polymer to the number of equivalents of the hydroxyl groups contained in the polysaccharide ranges from about 5:1 to about 1:50. Preferably, the ratio of the sum total number of equivalents of the carboxyl functional groups contained in the polycarboxylated polymer to the number of equivalents of the hydroxyl groups contained in the polysaccharide ranges from about 3:1 to about 1:20.

In certain embodiments of the present invention, Lewis acid and Lewis base catalysts may be used in combination with the crosslinking system in order to further enhance crosslinking. Such catalysts generally include clays, silica, including without limitation colloidal silica, organic amines, quaternized-amines, metal oxides, metal sulfates, metal chlorides, urea sulfate, urea chloride and silicate-based catalysts. Phosphorus-containing catalysts may be used in the present invention, including without limitation alkali metal hypophosphite salts, alkali metal phosphites, alkali metal polyphosphates, alkali metal dihydrogen phosphates, polyphosphoric acid and alkyl phosphinic acids. Such catalysts, when used, are used in less than stoichiometric amounts as the maximum level allowed, and in minimum amounts effective to effectuate or improve crosslinking compared to a non-catalyzed, crosslinked composition.

In addition to the polysaccharide and the polycarboxylated polymer of the crosslinking system, a small molecule polyol or alkanolamine may also be added. By the term "small molecule" is meant a non-polymeric, low molecular weight material and more particularly a molecular weight of less than 1000. Surprisingly, it was found that the addition of the small molecule polyol or alkanolamine can result in significant beneficial crosslinking effects, such that the level of crosslinking exceeded that obtained with either the polysaccharide and polycarboxylated polymer combination or the small molecule polyol and polycarboxylated polymer combination.

The small molecule polyol or alkanolamine must contain at least two functional groups, which are either hydroxyl or amine groups, at least one of which is a hydroxyl. That is the two functional groups can both be hydroxyl or one can be hydroxyl and the other an amine group.

The alkanolamine comprises an amine-nitrogen, from one to six hydroxyl groups and has from two to four carbon atoms disposed between any amine-nitrogen and each of the hydroxyl groups. Preferably, the alkanolamine comprises an amine group and at least one $C_2-C_4$ alkanol. Preferably, the alkanolamine comprises from two to four hydroxyl groups. The term "amine-nitrogen" is used herein to denote the nitrogen atom of the amine group.

The small molecule polyol which may be used will contain at least two hydroxyl groups. The amount of small molecule polyol or alkanolamine which can be used in the composition of this invention can vary from 0 to 1000% by weight based on the weight of the polysaccharide.

Exemplary small molecule polyols or alkanolamines include, without limitation, monoethanolamine, diethanolamine, triethanolamine, methyldiethanolamine, ethyldiethanolamine, phenyldiethanolamine, diisopropanolamine, triisopropanolamine, di-sec-butanolamine, tri-sec-butanolamine, tris(hydroxymethyl) aminoethane, 2-amino-2-methyl-1,3-propanediol, dimethylethanolamine, aminoethyl-ethanolamine, butylethanolamine, phenylethylethanolamine, 2-amino-1-butanol, bis(hydroxyethyladipamide), bis(hydroxyethyl) urea, ethylene glycol, glycerol, pentaerythritol, trimethylolpropane, sorbitol, sucrose, glucose, resorcinol, catechol, pyrogallol, and 1,4-cyclohexanediol.

In methods of crosslinking the polycarboxylated polymers with the polysaccharides, the polysaccharide and polycarboxylated polymer are combined under conditions effective to induce crosslinking of the polycarboxylated polymer. Such conditions permit water to be removed from the system, thereby inducing crosslinking. These conditions may be provided by adjusting temperature and/or pressure. For example, it is advantageous to cure the compositions at temperatures around 100° C., preferably greater than 100° C., in order to drive off water from the system. In fact, one of the advantages of the crosslinking systems of the present invention is that they are stable at elevated temperatures and therefore work particularly well in systems which must be cured at temperatures greater than 100° C. In contrast, small molecule saccharides exhibit a tendency to degrade and discolor at elevated temperatures. Curing may occur at pressures where water may be removed from the system, for example at low pressures or under vacuum. Both temperature and pressure may be adjusted such that water may be removed from the system. Additionally, crosslinking may be induced by chemical reaction. For example, as noted herein above, under certain conditions polycarboxylated polymers may be generated in situ. Whether crosslinking be induced by heating or by chemical reaction, the conditions must be effective to remove water from the system, thereby inducing crosslinking.

Compositions of the present invention may be used in preparing a number of compositions and articles of manufacture and may be applied to polymeric natural substrates, such as woven or non-woven cellulose, wood, leather, paper, cotton, wool, rayon and silk, and polymeric synthetic substrates, such as polyolefin, polyester, polyamide, polyvinyl chloride, polyvinylidene chloride and polyimide. Other substrates to which the compositions may be applied include glass, metal and composite substrates such as sand, ceramic, foundry sand and molds. The compositions may be used in preparing coatings, such as automotive coatings, powder coatings, adhesive coatings, inks and paints. The compositions also may be used as binders or sizing agents in the preparation of, for example, glass or cellulosic fibers, non-woven paper products, fiberglass insulation or batting, glass fiber rovings and molded fiberglass articles. The compositions also may be used as binders in woven and non-woven textiles and as backcoatings in carpets and other textiles. The compositions further may be used as saturants in the preparation of laminates, foams and mastics and as adhesives for the natural and synthetic substrates noted above.

Representative crosslinking systems of the present invention are set forth below.

Procedure for Determining Extent of Crosslinking by Measuring Percent Insoluble in Water (Ambient Conditions)

1. Combine the polysaccharide and the polycarboxylated polymer in specified amounts, based on equivalent weights.
2. Cast film in petri dish and dry overnight under ambient conditions.
3. Cut approximately 1 g piece of film and weigh accurately.
4. Put film in weighed 1 oz glass jar and cure according to specified time/temperature schedule. Weigh film again.
5. Fill jar with water (or other specified solvent). Cap jar and store overnight under ambient conditions.
6. Filter sample through weighed stainless 200 mesh screen.
7. Dry sample and screen to constant weight. Reweigh for final weight.
8. Calculate percent insoluble % Insoluble=dried sample weight/cured sample weight×100%.

Procedure for Determining Extent of Crosslinking by Measuring Percent Insoluble in Water (Refluxing Conditions)

1. Prepare formulation to 25% solids.
2. Using a four-place analytical balance, tare a 250 mL flask. Record tare weight.
3. Add 5–6 grams material to flask and record weight.
4. Place unstoppered in 120° F. oven overnight.
5. Cap upon removing; allow to cool and record weight. Calculate % solids.
6. Unstopper flasks for curing. Cure schedule: 10 minutes at 1 50° C.
7. Cap upon removing, allow to cool and record weight. Calculate % solids.
8. Pipet 100 mL deionized water into each flask.
9. Attach condenser to flask and reflux for 2 hours, using hot plate heater.
10. After cooling, filter solutions through Ahistrom 617 grade filter paper, into a 125 mL flask.
11. Using a four-place analytical balance, record weights of aluminum tares, two for each sample.
12. Pipet 10 mL of each solution into the weighing tins.
13. Dry overnight at 140° F.
14. Reweigh pans and calculate % insoluble % Insoluble=(1−|residue weight×10|)/cured film weight×100%.

Note in the above procedures, the % insolubles indicates the relative amount of crosslinking in the composition with greater insolubility indicating a greater degree of crosslinking.

The following tables set forth crosslinking data for compositions of the present invention and for comparative compositions. All parts or percents are by weight and all degrees are Celsius unless otherwise indicated. The molecular weights are weight average. In these examples the percent water insolubility is an indication of the degree or amount of crosslinking. Greater insolubility indicates a greater degree of crosslinking with about 50% or more being considered generally better for a thermoset system. As 100% insolubility is approached, it represents a high degree of crosslinking and water resistance making these compositions suitable in thermosetting systems for different applications.

TABLE 1

Different Types of Starch with Low Molecular Weight Poly(acrylic acid)

| Polysaccharide | % Water Insoluble |
| --- | --- |
| amioca, 3% OSA-modified, 54 water fluidity (MW = 64 × 10$^6$) | 99 |
| amioca, 3% OSA-modified, 85 water fluidity (MW = 1 × 10$^6$) | 99 |
| enzyme converted starch, 10 DE[1] | 89 |
| maltodextrin, 3% OSA, 2–5 DE[1] | 91 |
| pyrodextrin, 95 water fluidity[1] | 86 | amioca is waxy corn starch
OSA = octenylsuccinic anhydride
DE = dextrose equivalents
[1]MW of these materials is from about 10 to 100 × 10$^3$
Polycarboxylated Polymer: 5,000 MW poly(acrylic acid)
Cure: 200° C.; 10 minutes
Carboxyl/Hydroxyl Ratio: 0.25

TABLE 2

Different Types of Starch with Mid-Molecular Weight Poly(acrylic acid)

| Polysaccharide | % Water Insoluble |
| --- | --- |
| amioca, 9% hydroxypropylated, 35 water fluidity, MW > 100 × 10$^6$ | 98 |
| amioca, 3% OSA-modified, 54 water fluidity (130° C., 10 minutes) MW = 64 × 10$^6$ | 95 (89) |
| amioca, 3% OSA-modified, 85 water fluidity, MW = 1 × 10$^6$ | 100 |
| enzyme converted starch, 10 DE[1] | 80 |
| maltodextrin, 3% OSA, 2–5 DE[1] | 80 |
| pyrodextrin, 95 water fluidity[1] | 70 | amioca is waxy corn starch
OSA = octenylsuccinic anhydride
DE = dextrose equivalents
[1]MW of these materials is from about 10 to 100 × 10$^3$
Polycarboxylated Polymer: 60,000 MW poly(acrylic acid)
Cure: 200° C.; 10 minutes
Carboxyl/Hydroxyl Ratio: 0.25

TABLE 3

Different Types of Starch with High Molecular Weight Poly(acrylic acid)

| Polysaccharide | % Water Insoluble |
| --- | --- |
| amioca, 9% hydroxypropylated, 35 water fluidity MW > 100 × 10$^6$ | 82 |
| amioca, 3% OSA-modified, 54 water fluidity MW = 64 × 10$^6$ | 98 |
| amioca, 3% OSA-modified, 85 water fluidity MW = 1 × 10$^6$ | 99 |
| enzyme converted starch, 10 DE[1] | 74 |
| maltodextrin, 3% OSA, 2–5 DE[1] | 85 |
| pyrodextrin, 95 water fluidity[1] | 70 | amioca is waxy corn starch
OSA = octenylsuccinic anhydride
DE = dextrose equivalents
[1]these materials have MW of from about 10 to 100 × 10$^3$
Polycarboxylated Polymer: 100,000 Mw poly(acrylic acid)
Cure: 200° C.; 10 minutes
Carboxyl/Hydroxyl Ratio: 0.25

TABLE 4a

| Refluxed Insolubles of Polysaccharides with Poly(acrylic acid) | |
|---|---|
| Film | % Water Reflux Insoluble |
| Poly(acrylic acid), control | 4.9 |
| Poly(acrylic acid)/amioca | 52.9 |
| Poly(acrylic acid)/ethanolamine, comparative example | 19.2 |
| Poly(acrylic acid)/triethanolamine, comparative example | 6.8 |

Polysaccharide: amioca is waxy corn starch, 3% OSA (octenylsuccinic anhydride) modified, 54 water fluidity MW = 64 × 10$^6$
Polycarboxylated Polymer: 60,000 Mw poly(acrylic acid)
Cure: 150° C., 10 minutes
Carboxyl/Hydroxyl Ratio: 3.33

TABLE 4b

Refluxed Insolubles of Polysaccharides with Poly(acrylic acid) and Small Molecule Polyol

| Film | Functional Group Ratio | % Water Reflux Insoluble |
|---|---|---|
| Poly(acrylic acid), control | — | 4.9 |
| Poly(acrylic acid)/amioca/ethanolamine | 1/0.15/0.15 | 91.8 |
| Poly(acrylic acid)/amioca/triethanolamine | 1/0.15/0.15 | 96.3 |
| Poly(acrylic acid)/amioca/ethanolamine | 1/0.3/0.3 | 86.6 |
| Poly(acrylic acid)/amioca/triethanolamine | 1/0.3/0.3 | 87 |

Polysaccharide: amioca is waxy corn starch, 3% OSA (octenylsuccinic anhydride)—modified, 54 water fluidity, MW = 64 × 10$^6$
Polycarboxylated Polymer: 60,000 MW poly(acrylic acid)
Cure: 150° C.; 10 minutes
Carboxyl/Hydroxyl Ratio: 3.33

TABLE 5

Crosslinking Systems on Glass Media

| Crosslinking System | Dry Tensile Strength (lb) |
|---|---|
| Poly(acrylic acid)/ amioca 75/25 w/w | 11.9 |
| Poly(acrylic acid)/ amioca 25/75 w/w | 9.7 |

Polysaccharide amioca is waxy corn starch, 3% OSA (octenylsuccinic anhydride)—modified, 54 water fluidity, MW = 64 × 10$^6$
Polycarboxylated Polymer 60,000 MW poly(acrylic acid)
Cure Schedule: 10 minutes @ 200° C.
Substrate: Whatman GF/B Glass Filter Paper
Method: Instron tensile tester, peak load at failure, 1 × 4.5" specimen
Pickup: 20%

The compositions noted above when saturated on glass paper show good tensile strength of about 10 or more.

TABLE 6

Crosslinking of Low Molecular Weight Poly(acrylic acid) with Starch versus Small Molecules

| Carboxylated Material | Saccharide | % Water Insoluble |
|---|---|---|
| Poly(acrylic acid), 5000 MW | amioca, 3% OSA-modified, 54 water fluidity MW = 64 × 10$^6$ | 88 |
| trimellitic acid MW < 300 | amioca, 3% OSA-modified, 54 water fluidity MW = 64 × 10$^6$ | 20 |
| Poly(acrylic acid), 5000 MW | lactose MW < 500 | |

TABLE 6-continued

Crosslinking of Low Molecular Weight Poly(acrylic acid) with Starch versus Small Molecules

| Carboxylated Material | Saccharide | % Water Insoluble |
|---|---|---|
| Poly(acrylic acid), 5000 Mw | sucrose MW < 500 | 0 | trimellitic acid, 99% obtained from Aldrich Chemical Company
amioca is waxy corn starch
OSA = octenylsuccinic anhydride
Cure: 150° C.; 10 minutes
Carboxyl/Hydroxyl Ratio: 0.25

We claim:

1. A composition comprising:
a polycarboxylated polymer comprising at least two carboxylic acid functional groups and having a weight average molecular weight of at least 1000, and a polysaccharide molecule selected from the group consisting of starch, cellulose, gums, alginates, pectin, gellan and modifications or derivatives thereof which are provided by etherification, esterification, acid hydrolysis, dextrinization, oxidation or enzyme treatment, the polysaccharide molecule present in amounts effective to provide crosslinked compositions, said polysaccharide having a weight average molecular weight of at least 10,000.

2. The composition of claim 1 wherein the ratio of the sum total number of equivalents of carboxyl functional groups contained in the polycarboxylated polymer to the number of equivalents of hydroxyl groups contained in the polysaccharide ranges from about 5:1 to about 1:50.

3. The composition of claim 2 wherein the molecular weight of the polycarboxylated polymer is 10,000 or more and the molecular weight of the polysaccharide is 100,000 or more.

4. The composition of claim 2 which further comprises an effective catalytic amount of a Lewis acid, Lewis base or phosphorus-containing catalyst.

5. The composition of claim 2 which further comprises from about 0 to 1000% by weight, based on the weight of the polysaccharide, of a small molecule non-polymeric polyol or alkanolamine having a molecular weight of less than 1000 and which contains at least two groups that are either hydroxyl or amine groups, at least one of which is an hydroxyl.

6. The composition of claim 2 wherein the ratio of the sum total number of equivalents of carboxyl functional groups contained in the polycarboxylated polymer to the total number of equivalents of hydroxyl groups contained in the polysaccharide ranges from about 3:1 to 1:20.

7. The composition of claim 6 which further comprises from about 0 to 1000% by weight, based on the weight of the polysaccharide, of a small molecule non-polymeric polyol or alkanolamine having a molecular weight of less than 1000 and which contains at least two groups that are either hydroxyl or amine groups, at least one of which is an hydroxyl.

8. The composition of claim 7 wherein the molecular weight of the polycarboxylated polymer is 10,000 or more and the molecular weight of the polysaccharide is 100,000 or more.

9. A method of crosslinking a polycarboxylated polymer comprising at least two carboxylic acid functional groups and having a weight average molecular weight of at least 1000, said method comprising combining the polycarboxylated polymer with a polysaccharide molecule having a weight average molecular weight of at least 10,000 in amounts and under temperature, pressure and chemical conditions effective to remove water and induce crosslinking and provide crosslinked compositions.

10. The method of claim 9 wherein the ratio of the sum total number of equivalents of carboxyl functional groups contained in the polycarboxylated polymer to the number of equivalents of hydroxyl groups contained in the polysaccharide ranges from about 5:1 to 1:50.

11. The method of claim 10 further comprising combining with the polycarboxylated polymer and the polysaccharide less than stoichiometric amounts of a catalyst.

12. The method of claim 10 wherein the polysaccharide is selected from the group consisting of starch, cellulose, gums, alginates, pectin, gellan and modifications or derivatives thereof which are provided by etherification, esterification, acid hydrolysis, dextrinization, oxidation or enzyme treatment.

13. The method of claim 12 which further comprises from about 0 to 1,000% by weight, based on the weight of polysaccharide, of a small molecule non-polymeric polyol or alkanolamine having a molecular weight of less than 1000 and which contains at least two groups that are either hydroxyl or amine groups, at least one of which is an hydroxyl.

14. The method of claim 12 wherein the molecular weight of the polycarboxylated polymer is 10,000 or more, the molecular weight of the polysaccharide is 100,000 or more and the ratio of equivalent carboxyl groups in the carboxylated polymer to equivalent hydroxyl groups in the polysaccharide ranges from about 3:1 to 1:20.

15. An article of manufacture comprising a composition which comprises a polycarboxylated polymer comprising at least two carboxylic acid groups and having a weight average molecular weight of at least 1,000, and a polysaccharide present in amounts effective to provide crosslinked compositions, the polysaccharide having a weight average molecular weight of 10,000 or more.

16. The article of claim 15 wherein the ratio of the sum total number of equivalents of carboxyl functional groups contained in the polycarboxylated polymer to the number of equivalents of hydroxyl groups contained in the polysaccharide ranges from about 5:1 to about 1:50.

17. The article of claim 16 wherein said polysaccharide is selected from the group consisting of starch, cellulose, gums, alginates, pectin, gellan and modification or derivatives thereof which are provided by etherification, esterification, acid hydrolysis, dextrinization, oxidation or enzyme treatment.

18. The article of claim 17 wherein the composition further comprises less than stoichiometric amounts of a catalyst.

19. The article of claim 17 which further comprises from about 0 to 1,000% by weight, based on the weight of polysaccharide of a small molecule non-polymeric poyol or alkanolamine having a molecular weight of less than 1000 and which contains at least two groups that are either hydroxyl or amine groups, at least one of which is an hydroxyl.

* * * * *